United States Patent [19]
Richter

[11] Patent Number: 5,727,706
[45] Date of Patent: Mar. 17, 1998

[54] ELECTRICAL OUTLET BOX WITH RECESS FOR RECEIVING CORD GRIP

[75] Inventor: Kevin R. Richter, North Haven, Conn.

[73] Assignee: Hubbell Incorporated, Orange, Conn.

[21] Appl. No.: 604,403

[22] Filed: Feb. 21, 1996

[51] Int. Cl.$^6$ ............................................. H02G 3/08
[52] U.S. Cl. ............................................. 220/3.2
[58] Field of Search .................... 220/3.2, 3.94, 220/4.26, 3.9, 3.8

[56] References Cited

U.S. PATENT DOCUMENTS

| | | | |
|---|---|---|---|
| 3,215,769 | 11/1965 | Slater | 220/3.2 |
| 4,244,483 | 1/1981 | Bauer et al. | 220/3.2 |
| 4,366,343 | 12/1982 | Slater et al. | 220/3.2 |
| 4,389,535 | 6/1983 | Slater et al. | 220/3.2 |
| 4,919,292 | 4/1990 | Hsu | 220/3.2 |
| 5,169,013 | 12/1992 | Lammens, Jr. | 220/3.2 |

*Primary Examiner*—Joseph M. Moy
*Attorney, Agent, or Firm*—Jerry M. Presson; Leopold Presser

[57] ABSTRACT

An electrical outlet box constituted of a plastic material and having wall structure including a hexagonal recess extending into a portion of the thickness of a wall. A through-hole is drillable within the recess to facilitate passage therethrough of a screw-threaded leading end of a cord grip into the outlet box. As a lock nut is torqued down onto the leading end of the cord grip within the outlet box, a hexagonal flange of the cord grip engages within the hexagonal recess so as to inhibit relative rotation between the cord grip and electrical outlet box to obviate the need for a wrench during the torquing down of the lock nut. This structure avoids the need for a custom designed cord grip and facilitates the use of existing cord grips normally designed for utilization with metallic electrical outlet boxes.

10 Claims, 1 Drawing Sheet

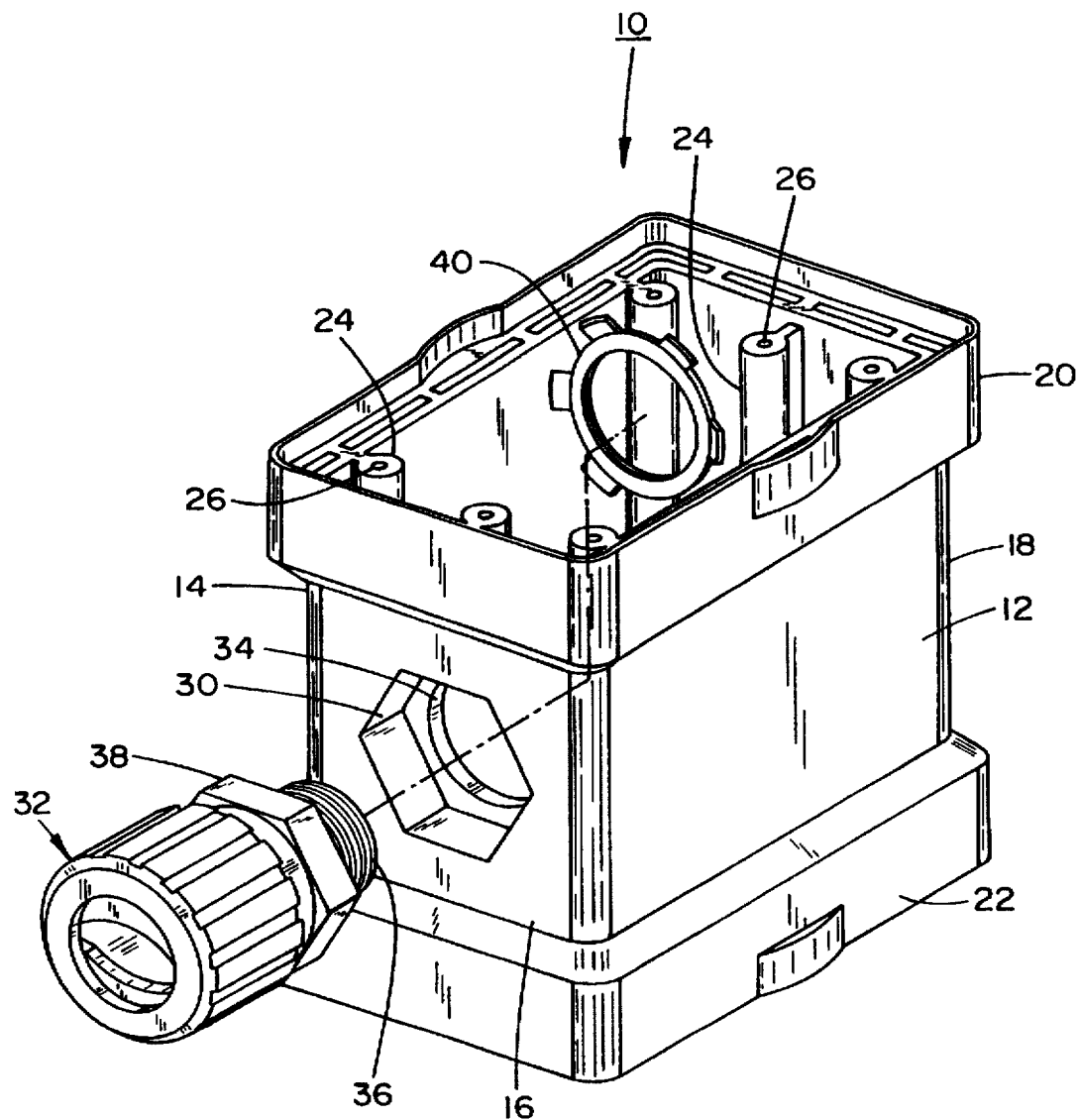

ELECTRICAL OUTLET BOX WITH RECESS FOR RECEIVING CORD GRIP

BACKGROUND OF THE INVENTION

1. Field of the Invention

The present invention relates to an electrical outlet box which incorporates a recess for retaining a cord grip in position; and more particularly, pertains to a portable electrical outlet box constituted from a plastic material which incorporates wall structure possessing a hexagonally-shaped recess adapted to retain a cord grip in position without necessitating the use of a wrench while torquing down a retaining nut located in the interior of the outlet box.

2. Discussion of the Prior Art

The employment of electrical outlet boxes which are adapted to retain a cord grip in position, for example, such as a so-called Kellems cord grip, is well known in the technology. Generally, the electrical outlet box is provided with an aperture through which a leading end of the cord grip may be extended into the outlet box, such leading end normally being equipped with an external screwthread, and a lock nut may then be torqued down on the screwthread so as to maintain the cord grip in fixed position on the outlet box, the latter of which is frequently of a metallic construction. Generally, this requires that the cord grip be clamped by means of a suitable wrench so as to be held secured against rotation while the lock nut is tightened thereon by means of a suitable torquing tool. This type of procedure, at times, necessitates the need for a custom designed cord grip in that various apertures or cutouts need to be formed in the electrical outlet box in conformance with particular types of existing cord grips which may be specifically designed for use with metallic electrical outlet boxes.

SUMMARY OF THE INVENTION

In order to avoid the necessity for the provision of a custom designed cord grip for use with electrical outlet boxes, particularly outlet boxes which are generally portable in nature, and facilitating the assembly of a Kellems cord grip which may be installed on the outlet box without the need of a wrench, pursuant to the present invention at least one side wall of the electrical outlet box is provided with a hexagonally-shaped recess which does not fully extend through the full thickness of the side wall, and wherein the center of the recess is provided with a drill point which can be drilled out to form a hold enabling passage therethrough of the leading end of a cord grip, such as Kellems cord grip. In this connection, the cord grip contains a hexagonal flange structure which fits into the hexagonally-shaped recess formed in the outer surface of the electrical outlet box, upon the leading end of the cord grip being passed through a hole which has been drilled out through the remaining wall thickness within the hexagonal recess, and whereby the cord grip is restrained from rotation relative to the electrical outlet box due to the interengagement between the hexagonal surfaces in the cord grip and the recess in the outlet box. This will then enable a lock nut to be threadingly applied onto the screw-threaded leading end of the cord grip and torqued down without requiring the use of a wrench to hold the cord grip secured in place against rotation relative to the outlet box.

Moreover, the use of the hexagonal recess and the provision of the centrally located drill point which will facilitate the drilling out of a through hole in the remaining wall thickness of the outlet box within the recess enables the installation of various types of cord grips without the need for custom designed configurations thereof, and permit employing existing cord grips which are designed for use with metallic electrical outlet boxes.

Accordingly, it is an object of the present invention to provide a novel electrical outlet box which incorporates a hexagonally-shaped recess extending through a portion of the thickness of a wall surface thereof, and which enables the drilling out of a hole through the remaining thickness to facilitate insertion therethrough of the leading end of a cord grip, and whereby a hexagonal flange on the cord grip, such as on a so-called Kellems cord grip, engages the hexagonal hole to prevent relative rotation between the cord grip and outlet box thereby enabling the locking in place of the cord grip by means of an internally positioned lock nut engaging the threaded leading end thereof in the absence of requiring any wrench gripping the cord grip to facilitate this attaching action.

Another object of the present invention is to provide an electrical outlet box of the type described which may be of a suitably molded plastic construction and which incorporates a hexagonally-shaped recess extending through a portion of the thickness of the outer wall surface thereof in at least one wall of the outlet box, and whereby a drill point enables the drilling out of a central hole or aperture within the hexagonal recess to permit the passage therethrough of the leading end of a cord grip of any particular design and construction.

BRIEF DESCRIPTION OF THE DRAWING

Reference may now be had to the following detailed description of a preferred embodiment of the invention, taken in conjunction with the accompanying single FIGURE of drawing illustrating a perspective exploded view of the inventive electrical outlet box and a Kellems cord grip adapted to be attached thereto.

DETAILED DESCRIPTION OF A PREFERRED EMBODIMENT

Referring now in detail to the drawing, there is illustrated, in a generally exploded perspective view, an electrical outlet box 10 which, in this instance, is preferably constituted from a molded thermoplastic material. The electrical outlet box 10, which may be portable in nature, includes a plurality of side walls, which include opposite side walls 12 and 14, and front and rear end walls 16 and 18. The upper and lower ends of the walls 12 through 18 may be provided with integrally molded upper peripheral flange structure 20 and lower peripheral flange structure 22 of similar rectangular configuration which, in essence, provides for a reinforcing structure for the electrical outlet box 10.

The upper end of the electrical outlet box 10 may be open and includes a plurality of upstanding integrally molded posts 24, each including an internal screwthread 26 adapted to have a closure cover (not shown) threadingly attached thereto so as to close off the interior of the outlet box 10.

Formed in the end wall 16, the latter of which is of a relatively thick construction is a hexagonal recess 30 extending through a part of the depth of the wall 16 so as to leave a closed inner wall portion within the hexagonal recess 30.

When it is desired to mount a cord grip, for example a Kellems cord grip 32 on the electrical outlet box 10, an inner wall thickness 34 may be drilled out within the hexagonal recess 30 through the application or previous formation of a drill point, and whereby the aperture 34 may be generally of a diameter enabling the passage therethrough of the screw-threaded leading end 36 of the cord grip 32.

The portion of the cord grip 32 adjacent the base of the screw-threaded leading end 36 is generally provided with a hexagonally-shaped flange 38, the outer dimensions of which are in conformance with the hexagonal shape of the recess 30 in the outlet box 10, whereby upon the cord grip being positioned so that the screw-threaded leading end 36 thereof passes through the hexagonal recess 30 and the drilled out hole 34, the hexagonal flange 38 will be positioned within the hexagonal recess 30 and in surface contact with hole 34 so as to prevent the relative rotation between the Kellems cord grip 32 and the electrical outlet box 10. This, in essence, will then facilitate a suitable interior lock nut 40 to be manually inserted through the upper open end of the electrical outlet box 10 and screwed or torqued down onto the screw-threaded leading end 36 of the cord grip 32 which projects into the outlet box 10, and in the absence of the requirement for any wrench having to be applied to the cord grip during the locking procedure of the cord grip to the outlet box.

Another aspect which resides in the foregoing invention is that the formation of the hexagonally-shaped recess 30 extending partially through the outer surface of the wall thickness so as to leave only an inner wall thickness 34 in place, facilitates the drilling out of variously dimensioned holes adapted to receive different types of cord grips without having to utilize custom designed cord grips for this application to a plastic molded electrical outlet box, and thereby facilitating the utilization of existing cord grips which are primarily designed for use with thin-walled metallic boxes.

From the foregoing it becomes readily apparent that the present invention is directed to a novel and unique concept in providing an electrical outlet box which enables the attachment thereto of a cord grip, such as a Kellems cord grip by simply drilling through an aperture 34 within a hexagonal recess 30 and which will avoid the necessity for supplying a gripping wrench during the torquing down of a lock nut 40 onto the leading end of the cord grip, while facilitating the use of differing cord grips designed for metallic electrical outlet boxes without the need for having to custom design such cord grips.

While there has been shown and described what is considered to be a preferred embodiment of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An electrical outlet box adapted to mount a cord grip having an externally threaded leading end insertable into said outlet box and an out-of-round structure of externally larger dimensions at the rear of said leading end, said outlet box including enclosing side walls and end walls; a recess of predetermined out-of-round configuration being formed in the outer surface of at least one of said walls and extending through an outer portion of the thickness of said at least one wall so as to leave a remaining wall thickness at the bottom of said recess, said remaining wall thickness for mounting of said cord grip being drilled to form a through-hole within said recess of a diameter substantially commensurate with the diameter of the leading end of said cord grip enabling the insertion therethrough of the leading end of the cord grip into said outlet box and facilitating torquing a lock nut thereon so as to fasten said cord grip to said electrical outlet box.

2. An electrical outlet box as claimed in claim 1, wherein said recess in said at least one wall has the out-of-round shape thereof dimensioned in conformance with the out-of-round structure of the cord grip and is adapted to be engaged by the out-of-round structure on the cord grip upon insertion of said cord grip leading end through the drilled hole into said outlet box so as to inhibit relative rotation between said cord grip and said outlet box during torquing of said lack nut.

3. An electrical outlet box as claimed in claim 2, wherein said out-of-round shape of said recess is of a hexagonal configuration, said complementary structure on said cord grip being a hexagonal flange adapted to closely fit within said hexagonal recess.

4. An electrical outlet box as claimed in claim 1, wherein said through-hole is drilled in the center of said out-of-record recess through said remaining wall thickness so as to form an aperture commensurate in diameter with the diameter of the leading end of the specific cord grip which is to be mounted on said outlet box.

5. An electrical outlet box as claimed in claim 1, wherein said outlet box is constituted of a plastic material.

6. An electrical outlet box as claimed in claim 5, wherein said plastic material comprises a generally rigid molded thermoplastic material.

7. An electrical outlet box as claimed in claim 1, wherein said electrical outlet box is portable.

8. An electrical outlet box as claimed in claim 2, wherein said lock nut is torqued onto said screw-threaded leading end of the cord grip from interiorly of said outlet box in the absence of any wrench for maintaining the cord grip secured against rotation relative to the outlet box.

9. An electrical outlet box as claimed in claim 2, wherein said cord grip is a Kellems cord grip.

10. An electrical outlet box as claimed in claim 2, wherein the out-of-record structure on said cord grip includes a surface bottoming on the recess wall surface having said drilled through-hole formed therein to position said out-of-round structure of cord grip in said out-of-round recess.

* * * * *